US012565920B2

(12) United States Patent
Andreev

(10) Patent No.: US 12,565,920 B2
(45) Date of Patent: Mar. 3, 2026

(54) GAS-HYDRAULIC SHOCK ABSORBER

(71) Applicant: Aleksandr Aleksandrovich Andreev,
Moscow (RU)

(72) Inventor: Aleksandr Aleksandrovich Andreev,
Moscow (RU)

( * ) Notice: Subject to any disclaimer, the term of this
patent is extended or adjusted under 35
U.S.C. 154(b) by 309 days.

(21) Appl. No.: 18/360,315

(22) Filed: Jul. 27, 2023

(65) Prior Publication Data

US 2025/0035181 A1 Jan. 30, 2025

(51) Int. Cl.
*F16F 9/34* (2006.01)
*F16F 9/06* (2006.01)
*F16F 9/36* (2006.01)

(52) U.S. Cl.
CPC ............ *F16F 9/3405* (2013.01); *F16F 9/061*
(2013.01); *F16F 9/063* (2013.01); *F16F 9/368*
(2013.01); *F16F 2222/12* (2013.01)

(58) Field of Classification Search
CPC .......... F16F 9/3405; F16F 9/061; F16F 9/063;
F16F 9/368; F16F 2222/12
See application file for complete search history.

(56) References Cited

U.S. PATENT DOCUMENTS

| | | | |
|---|---|---|---|
| 3,171,546 A * | 3/1965 | Frederick ................. | B61G 9/10 |
| | | | 188/289 |
| 3,656,632 A * | 4/1972 | Karakashian ........... | F16F 9/486 |
| | | | 188/316 |
| 2021/0354778 A1* | 11/2021 | Oike ........................ | F16F 9/34 |

* cited by examiner

*Primary Examiner* — Timothy Hannon
(74) *Attorney, Agent, or Firm* — Westbridge IP LLC

(57) ABSTRACT

A gas-hydraulic shock absorber contains a housing having a
filler plug, a movable buffer installed in the housing, a
movable separating piston, throttle valves, and a bypass
valve. The housing is formed by a cylinder fixed on a base
and plugged with a bottom on one side, and having an
installed axle box on its opposite side. The movable buffer
is a hollow rod, plugged on one end with a removable cover
with a gas-charging valve placed in it, and plugged on the
opposite end with a fixed throttle piston. The movable
separating piston is made with at least one annular groove
for placing seals and an annular guide element in the annular
grooves. The movable separating piston is arranged in the
hollow rod.

2 Claims, 1 Drawing Sheet

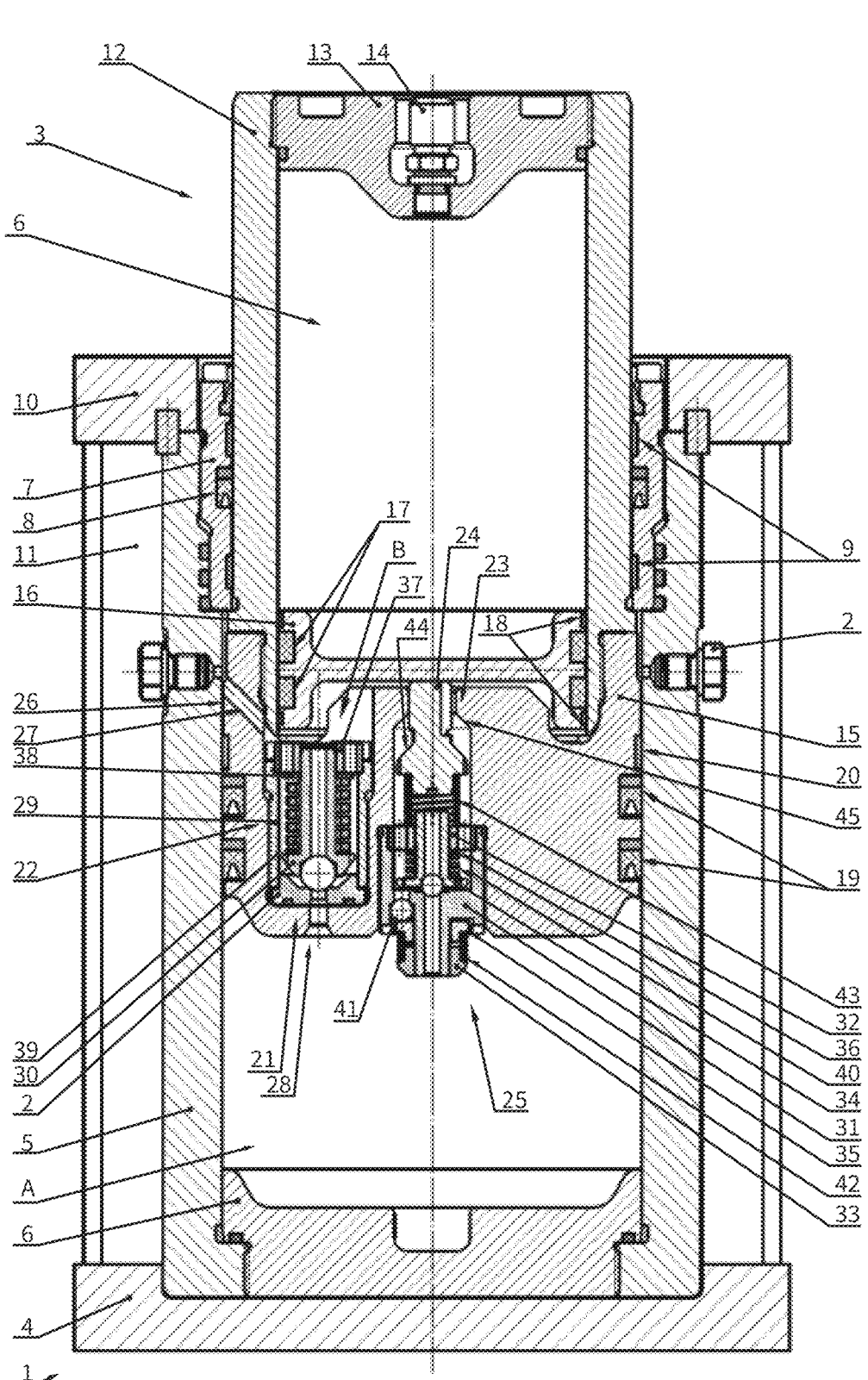

GAS-HYDRAULIC SHOCK ABSORBER

TECHNICAL FIELD

The application relates to the field of railway transport and relates to devices designed to absorb energy from longitudinal forces acting on railroad cars and locomotives during train or shunting operations of vehicles.

BACKGROUND

A gas-hydraulic shock absorber according to inventor's certificate SU688364, IPC B61G9/08, Sep. 30, 1979, for A GAS-HYDRAULIC SHOCK ABSORBER FOR AUTO-MATIC COUPLING DEVICES is known. The known gas-hydraulic shock absorber consists of a cylindrical housing, which contains a resilient piston, a plunger, a bottom, a gas-hydraulic shock absorber with holes, and a metering pin with a check valve having throttle holes, axle boxes, and nuts. The plunger contains a floating piston with an elastic ring and a diaphragm equipped with a sealing element, a seat that limits the area of interaction of the piston with the hydraulic fluid during their contact, and also contains a check valve, charging fittings, a plug, seals, gas chambers of the elastic element A and the gas-hydraulic shock absorber B, and the hydraulic cushions I, D, and E. The main disadvantages of the known gas-hydraulic shock absorber are the complexity of the design, and low manufacturability.

The closest to the claimed one herein in terms of technical essence is the technical solution according to inventor's certificate SU796028, IPC D61G9/08, Jan. 15, 1981, for A GAS-HYDRAULIC SHOCK ABSORBER FOR AUTO-MATIC COUPLING DEVICES FOR RAILWAY VEHICLES, taken as the closest analogue. The known GAS-HYDRAULIC SHOCK ABSORBER FOR AUTO-MATIC COUPLING DEVICES FOR RAILWAY VEHICLES consists of a tower with a welded bottom, which includes a movable plunger, the stroke of which is limited by a threaded sleeve. The absorber has three chambers: the chambers A and B filled with oil, and the chamber C filled with gas. The chambers B and C are arranged in the plunger and separated from each other by a floating piston. The high-pressure chamber A is separated from the low-pressure chamber B by a diaphragm. A drain valve moves in the diaphragm, which is pressed by a spring against the seat fixed in the diaphragm by a threaded sleeve. The end part of the drain valve, made in the form of a hydraulic cylinder with holes in the wall, exits through the nozzle hole of the seat into the high-pressure chamber A. A control spring, through an intermediate piston, which moves in the cylindrical cavity of the end part of the drain valve, presses the control valve passing through the drain valve and an insulating sleeve fixed by a threaded sleeve. The high-pressure chamber A and the intermediate chambers D and E are connected by channels drilled in the diaphragm. To control the hydraulic resistance of these channels, a throttle is installed. The main disadvantages of the known gas-hydraulic shock absorbers are the use of springs and the complexity of the design, as well as rather rigid performance characteristics of their operation.

SUMMARY

The technical result of the application is the technical result which consists in increasing the energy intensity and manufacturability while simplifying the design and providing the possibility to obtain more elastic and stable characteristics of operation, which in turn increases the reliability of the shock absorber.

The specified technical result is achieved by the fact that in the gas-hydraulic shock absorber for railway vehicles, comprising a housing having a filler plug, a movable buffer installed in the housing, a movable separating piston, throttle valves, a bypass valve, the housing is formed by a cylinder fixed on a base and plugged with a bottom on one side, and having an installed axle box on its opposite side, which have at least one annular groove made in its wall for placing seals and annular guide elements in the annular grooves, and the cylinder is pressed on the side of the axle box by a stop connected to the base by means of ribs. The movable buffer is a hollow rod, plugged on one end with a removable cover with a gas-charging valve placed in it, and plugged on the opposite end with a fixed throttle piston. In addition, the hollow rod with the throttle piston is placed through the axle box in the cylinder plugged with the bottom, to provide the possibility of movement and to form the chamber A between the bottom of the cylinder and the throttle piston. The movable separating piston is made with at least one annular groove for placing seals in the annular grooves and an annular guide element, and is arranged in the hollow rod to form the chamber B filled with gas under the initial pressure between the separating piston and the removable cover with the gas-charging valve placed in it, and the additional chamber B between the separating piston and the throttle piston. In addition, the throttle piston is made in the form of a drum, with at least one groove along the outer surface for placing seals and an annular guide element in the grooves, and at least one seat is made in its inner part for placing spring-loaded throttle valves in the seats, and a seat is made in the throttle piston for installation in it, to provide the possibility of interaction with the separating piston, of a movable spring-loaded striker with profile grooves, and a bypass valve placed under it, having an adapter, a bypass sleeve, an adjusting washer, a gate, balls, a clamping flange and a nut, with overflow channels made in the wall of the throttle piston, and a connecting channel is made under each throttle valve, with each spring-loaded throttle valve consisting of a sleeve, a guide, an adjusting washer, a spring and a needle, and with the bypass valve including an adapter, a bypass sleeve, an adjusting washer, a spring, a gate, at least three balls, a clamping flange, and a nut.

Such a mutual arrangement of the parts and the structural design of the claimed gas-hydraulic shock absorber provides an increase in energy intensity and, in the course of its operation, creates conditions under which the process of damping the kinetic energy of the impact is carried out according to a more elastic and stable characteristic in all operation modes. In addition, the implementation of the throttle valves and the bypass valve not in the cylinder wall, but in the throttle piston made in the form of a drum, and the implementation of grooves for placing sealing glands and guides on the outer surface of the drum and the axle box eliminate the possibility of exposure to high pressure (load) on the sealing glands and guides, which increases their reliability and, as a result, increases the service life of the gas-hydraulic shock absorber.

BRIEF DESCRIPTION OF THE DRAWINGS

FIG. 1 is a sectional view of a gas-hydraulic shock absorber according to an embodiment of the present application.

DETAILED DESCRIPTION OF THE EMBODIMENTS

The application is illustrated in a drawing, where FIG. 1 shows the gas-hydraulic shock absorber in section.

The gas-hydraulic shock absorber contains the housing 1 with the filler plug 2, and the movable buffer 3 installed in the housing 1. The housing 1 is formed by the cylinder 5 fixed on the base 4, which is plugged by the bottom 6 on one side and has the installed axle box 7 on its opposite side. The axle box 7 has the annular grooves 8 and 9 made in its wall for placing seals and annular guide elements in the annular grooves (respectively). The cylinder 5 is pressed on the side of the axle box 7 by the stop 10 connected to the base 4 by means of the ribs 11. The movable buffer 3 is the hollow rod 12 plugged on one end with the removable cover 13 with the gas-charging valve 14 placed in it, and plugged on the opposite end with its fixed throttle piston 15. The hollow rod 12 with the throttle piston 15 is placed through the axle box 7 in the plugged cylinder 5, to provide the possibility of movement and to form the chamber A between the bottom 6 of the cylinder 5 and the throttle piston 15. The movable separating piston 16 is made with the annular grooves 17 and 18 for placing seals and an annular guide element (respectively) in the annular grooves and is arranged in the hollow rod 12 to form the chamber B filled with gas under the initial pressure between the separating piston 16 and the removable cover 13 with the gas-charging valve 14 placed in it, and the additional chamber B between the separating piston 16 and the throttle piston 15, with the throttle piston 15 made in the form of a cylindrical drum with the grooves 19 and 20 along the outer surface for placing seals and an annular guide element in the grooves (respectively), and at least one seat 21 is made in the inner part of the cylindrical drum for placing the spring-loaded throttle valve 22 in the seat, and the seat 23 is made in the throttle piston 15 for installation in it, to provide the possibility of interaction with the separating piston 16, of the movable gate striker 24 spring-loaded with the spring 43, with profile grooves, and the bypass valve 25 placed under it. The overflow channels 27 are made in the wall 26 of the throttle piston 15, and a connecting channel 28 is made under each throttle valve 22. Each spring-loaded throttle valve 22 consists of the sleeve 29, the guide 37, the adjusting washer 38, the spring 39 and the needle 30, and the bypass valve 25 includes the adapter 31, the bypass sleeve 32, the adjusting washer 36, the spring 40, the gate 34, the balls 41, the spring 42, the clamping flange 35, and the nut 33.

The operation of the claimed gas-hydraulic shock absorber is based on the principle of converting the kinetic energy of the impact of the moving masses of railroad cars into thermal energy by throttling the hydraulic fluid through a regulating device, the function of which in this case can be performed by the throttle piston 15.

The gas-hydraulic shock absorber filled with gas under the required pressure and with hydraulic fluid (oil) is operated as follows: at low movement speeds/at small initial displacements/at small compressive forces of collision, the hollow rod 12 and the throttle piston 15 move towards the bottom 6, acting on the hydraulic fluid and increasing the pressure in the chamber A. The hydraulic fluid under pressure acts through the channels of the bypass valve on the gate and the striker, moving them by a certain amount along the axis, and acts through the profile grooves of the striker on the separating piston. Then the process stops at the moment when the contact surface 44 of the striker 24 contacts with the corresponding contact surface 45 of the throttle piston 15.

At high movement speeds and/or at large displacements, and/or at high shock loads on the shock absorber, which occurs during shunting collisions of railroad cars and transient modes of train movement, the gas-hydraulic shock absorber is compressed at high speeds. This leads to significant increases in the hydraulic resistance of the throttling holes and the pressure drop across the throttle piston 15. When the pressure reaches the pressure to which each throttle valve is set, they are triggered, and the throttling holes 28 are opened. The hydraulic fluid under high pressure is throttled from the chamber A into the additional chamber B with reduced pressure. In other cases, they are in the initial position.

What is claimed is:

1. A gas-hydraulic shock absorber, comprising a housing having a filler plug, a movable buffer installed in the housing, a movable separating piston, throttle valves, and a bypass valve, wherein the housing is formed by a cylinder fixed on a base and plugged with a bottom on one side, and having an installed axle box on its opposite side, which have at least one annular groove made in its wall for placing seals and annular guide elements in the annular grooves, and the cylinder is pressed on the side of the axle box by a stop connected to the base by means of ribs, the movable buffer is a hollow rod, plugged on one end with a removable cover with a gas-charging valve placed in it, and plugged on the opposite end with a fixed throttle piston;

the hollow rod with the throttle piston is placed through the axle box in the plugged cylinder, to provide the possibility of movement and to form a high-pressure chamber between the bottom of the cylinder and the throttle piston;

the movable separating piston is made with at least one annular groove for placing seals in the annular grooves and an annular guide element, and is arranged in the hollow rod to form the high-pressure chamber between the separating piston and the removable cover with the gas-charging valve placed in it, and an additional low-pressure chamber between the separating piston and the throttle piston;

the throttle piston is made in the form of a drum, with at least one groove along the outer surface for placing seals and an annular guide element in the grooves, and at least one seat is made in its inner part for placing spring-loaded throttle valves in the seats, and a seat is made in the central part of the throttle piston for installation in it, to provide the possibility of interaction with the separating piston, of a movable gate striker spring-loaded with a spring, with profile grooves, and the bypass valve placed under it, with overflow channels made in the wall of the throttle piston, and a connecting channel is made under each throttle valve.

2. The gas-hydraulic shock absorber according to claim 1, wherein each spring-loaded throttle valve consists of a sleeve, a guide, an adjusting washer, a needle and at least one spring, and the bypass valve includes an adapter, a bypass sleeve, a nut, a gate, at least three balls, a clamping flange, an adjusting washer, and at least two springs.

* * * * *